United States Patent [19]

Doehnert

[11] 4,299,741

[45] Nov. 10, 1981

[54] AQUEOUS RELEASE COATING COMPOSITIONS

[75] Inventor: Donald F. Doehnert, Millington, N.J.

[73] Assignee: Permacel, New Brunswick, N.J.

[21] Appl. No.: 127,702

[22] Filed: Mar. 6, 1980

[51] Int. Cl.³ .............................................. C08L 1/00
[52] U.S. Cl. .................... 260/17.4 CL; 260/29.6 AN; 260/29.6 RB
[58] Field of Search .............. 260/17.4 CL, 29.6 AN, 260/29.6 RB

[56] References Cited

U.S. PATENT DOCUMENTS

| | | | |
|---|---|---|---|
| 3,305,505 | 2/1967 | Ropp | 260/29.6 RB |
| 3,502,497 | 3/1970 | Crocker | 117/68.5 |
| 3,894,980 | 7/1975 | DeTommaso | 260/29.6 RW |

Primary Examiner—Bernard D. Pianalto
Attorney, Agent, or Firm—Alice O. Robertson

[57] ABSTRACT

Aqueous release backsize compositions are provided which when applied to films provide easy unwind properties without adversely affecting the adhesive properties of pressure-sensitive tapes.

9 Claims, No Drawings

AQUEOUS RELEASE COATING COMPOSITIONS

The present invention relates to aqueous release backsize compositions and to film backed pressure-sensitive tapes coated therewith.

Rolls of pressure-sensitive film tapes normally have a release agent applied to the back side of the film to facilitate unwinding. This is especially important if the tapes are stored for extended periods of time. Suitable release agents are described in U.S. Pat. Nos. 2,532,011, 2,607,711, 2,876,894, 3,502,497 and 3,851,761, and Australian 233,174; however, all these patents disclose coating employing an organic solvent solution of release polymers. Regulations for maintaining atmospheric purity necessitates reduction in solvent emitted when solvent coated films are dried. To accomplish such reduction, costly solvent recovery or wasteful combustion with afterburners are necessary. Coating from a non-polluting water system is desirable but known methods are of limited applicability. For example, U.S. Pat. No. 2,607,711 and Australian Pat. No. 149,965 patents teach emulsifying release polymer in morpholine and water. This is quite satisfactory for coating cellophane or other hydrophilic film surfaces but is unsatisfactory for use on hydrophobic films such as polyester, polypropylene, polyvinyl chloride, polyimide, cellulose acetate and like films. When aqueous compositions of release agents are applied to hydrophobic surfaces, uniform release is not achieved.

According to the present invention a novel aqueous release composition has been discovered which composition is suitable for coating hydrophobic surfaces, dries to a thin, smooth coat, and provides good release of pressure-sensitive adhesives, and which further can be employed in manufacturing operations while meeting air purity regulations. More specifically, the present invention is to aqueous compositions which comprise (1) a novel acrylate terpolymer as a release polymer, (2) a base, (3) a wetting agent, and (4) a water-soluble thickening agent, and to articles coated with such compositions. The compositions are generally transparent, colorless to light ambercolored compositions which when coated onto a hydrophobic film form a smooth coating from which good release may be obtained from both rubber-based and acrylate-based adhesives.

When the term "an acrylic acid" or "an acrylate" or "an acrylonitrile" is hereinafter used it is meant to be acrylic or methacrylic acid, ester or nitrile, respectively. When the compound is specifically acrylic or methacrylic acid or one of its derivatives, the correct full name is employed.

The novel release polymer in the compositions of the present invention is obtained by the polymerization of three monomers, namely, a higher alkyl acrylate ester monomer, a carboxyl supplying monomer and an acrylate derived hardening monomer. The acrylate ester monomer may be represented by the following structure

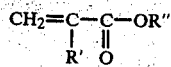

wherein R' is hydrogen or methyl, and R" is a straight chain hydrocarbon radical of from about 12 to about 24 carbon atoms.

A preferred acrylate ester is stearyl methacrylate. The carboxyl supplying monomer is a polymerizable unsaturated acid or a substance readily supplying an acid group such as an anhydride, and is preferably selected from acrylic acid, methacrylic acid, maleic acid, maleic anhydride, half esters of maleic acid, itaconic acid, and fumaric acid. The hardening monomer is preferably acrylonitrile. The relative amounts of monomer components in the polymer generally corresponds to the relative amounts of the component monomers supplied in the polymerization. The monomer components employed are from about 40 to about 80 parts, preferably 50 to 60 parts of acrylate release monomer, from about 5 to about 30 parts, preferably 10 to 20 parts of carboxyl supplying monomer and from about 10 to about 45 parts preferably 20 to 30 parts of hardening monomer all based on 100 parts of total monomer employed.

The polymer is generally a low melting, wax-like solid having a softening point above about 50° C., having a sufficient number of carboxylic acid groups to have an acid number of at least about 80. Generally, the terpolymers are in the molecular weight range of from about 150,000 to 300,000.

The base component is preferably an amine having a boiling point below about 150° C., preferably below 120° C. Suitable amines include triethylamine, morpholine, ethylamine, n-propylamine, isopropylamine, n-butylamine, isobutylamine, sec-butylamine, tert-butylamine, n-amylamine, isoamylamine, 2-amino-2-methylbutane, dimethylamine, diethylamine, diisopropylamine, trimethylamine, morpholine, pyridine, the collidenes and the like.

The wetting agent is preferably a polar organic solvent such as acetone, methyl ethyl ketone, isopropyl alcohol, tert-amyl alcohol, n-propyl alcohol, sec-butyl alcohol, isobutyl alcohol, methyl n-propyl ketone, diethyl ketone and the like.

Suitable thickening agents include sodium carboxymethylcellulose, hydroxyethylcellulose, acrylic polymers such as those sold under the trade name "Acrysol ® ASE-60" by Rohm and Haas Company, "Carbopol ® 934" by the B. F. Goodrich Company and "Lytron ® 890" by Monsanto Chemical Company, and the like. Other thickening agents which perform thickening functions hereinafter described are also suitable. Unmodified natural thickening agents such as guar gums are also suitable but because of their susceptibility to microbial attack they are less desirable.

Generally, the compositions are formulated to provide a polymer content in the final aqueous composition in the range of from about 2 to about 20 percent by weight. The desirable amounts of the other components depend on the release agent terpolymer. The base is employed in an amount sufficient to bring the aqueous composition into the basic side of neutrality. The wetting agent may be employed in an amount sufficient to provide suitable flow properties with a maximum of about 35 percent of the non-volatile (terpolymer) components.

Since thickening agents are available in varying broad molecular weight ranges and degree of crosslinking, the desirable amounts depend on the particular thickener. Generally, the amount of thickening agent should be that which imparts a viscosity at room temperature to the ultimate release composition of from about 5 to about 200 centipoises, preferably about 25 to 50 centipoises. It is generally not desirable to use such amounts of thickener that the viscosity of the ultimate release composition exceeds 200 centipoises since then the fluidity would be decreased to an extent as to render the composition unsuitable for providing a thin coating. It is found that when employing commercially available aqueous solutions of thickeners of viscosity below about 50 centipoises, from about 8 to about 28 parts by weight of thickener for 100 parts by weight of terpolymer, both on dry solid basis, are suitable.

The terpolymer may be prepared by polymerization of the component monomers in a polar solvent in an inert, e.g., nitrogen, atmosphere in the presence of a polymerization catalyst. Suitable polar solvents include acetone, methyl ethyl ketone, isopropyl alcohol and the like. Suitable catalysts are free radical catalysts, and particularly preferred are diazo catalysts such as azobisisobutyronitrile, $((CH_3)_2C(CN)N=N-C(CH_3)_2CN)$.

The reaction may be carried out by mixing the monomers in an appropriate solvent, adding a small amount of catalyst to the reaction mixture to initiate the reaction, slowly adding a solution of the catalyst in the polar solvent while stirring and heating, and then continuing the stirring and heating for a period of several hours until the reaction is complete with the formation of the desired product terpolymer in the reaction mixture.

The reaction mixture containing the polymer may be employed in the preparation of the release coating composition without purification or isolation of the terpolymer. In carrying out the preparation, an amine is added to the reaction mixture, and the basified solution then is diluted with water or water-solvent mixture to the desired solids content. Thereafter, a thickening agent in a water-solvent blend is added and the resulting composition thoroughly mixed to obtain the release coating composition of the present invention.

The release coating composition may be applied to the backside of a film, i.e., the side opposite to the side supporting an adhesive by any of the standard coating techniques, such as by use of an air knife, sharp knife, Meier rod, gravure and the like. The amount of coating composition to be employed is very small, such amounts being that sufficient to supply from 0.001 to 0.1 ounce of release polymer (dry basis) per square yard of film. The coated film then is dried to drive off water, solvents and amine, and to obtain a film of release polymer on the backside of the adhesive supporting film. The film coated with release polymer on the backside and adhesive on the front side may be slit to form pressure-sensitive adhesive tapes. Such tapes may be readily unwound from a roll without requiring excessive unwind force and without loss of adhesive mass.

The release composition is applicable for employment on any of the conventional hydrophobic films obtained from polymers such as polyesters, polypropylene, polyvinyl chloride, polyimide, polyethylene, cellulose acetate and the like. It is also effective against most conventional pressure-sensitive adhesives such as those based on natural rubber, isobutylene, polyvinyl ether, silicones, synthetic rubbers such as styrene-butadiene rubber, isoprene and block copolymer rubbers, as well as adhesives based on acrylates.

The following examples illustrate the invention but are not to be construed as limiting:

EXAMPLE I

A. Preparation of Terpolymer 250 grams of stearyl methacrylate, 158 grams of acrylonitrile, 74 grams of glacial methacrylic acid, 100 grams of isopropyl alcohol and 30 grams of acetone are charged into a 4-neck 2-liter flask equipped with a stirrer, reflux condenser, thermometer and nitrogen inlet, and the vessel flushed with nitrogen. To the mixture is added 1.5 grams of azobisisobutyronitrile polymerization catalyst and the resulting mixture heated until a mild exothermic reaction takes place. Thereafter, a solution of 4 grams of the catalyst in 400 grams of isopropanol is added slowly with stirring and heating over a period of 3 hours; after completion of the addition, the heating is continued for an additional 4 hours under reflux conditions to obtain in the reaction mixture a terpolymer of stearyl methacrylate, acrylonitrile and methacrylic acid. The polymer solution having a final solids content of about 45 percent and representing a 94.5 percent conversion, is allowed to cool; it is employed to prepare an aqueous dispersion as hereinafter described.

B. Preparation of Aqueous Coating Compositions

In separate operations, 10 parts by weight of triethylamine is added to separate samples of 100 parts of a terpolymer solution (45 percent solids) obtained as above described. To the resulting mixtures are added in separate operations, previously prepared solutions of representative thickeners in a 1:4 solvent blend of methyl ethyl ketone/water, followed by the solvent blend containing no thickener to produce aqueous release compositions of 3.5 percent solids content and having components shown in Table I. A control composition having no thickener is also prepared.

C. Preparation of an Adhesive Solution

An adhesive solution is prepared by placing the following ingredients in a mixer and agitating in the mixer for eight hours:

|  | Parts by Weight |
|---|---|
| Kraton ® 1107* | 100 |
| WingTack ® 95** | 80 |
| Zinc dibutyl dithiocarbamate | 2 |
| Tertiary-amylhydroquinone | 1 |
| Toluene | 275 |

*Styrene-isoprene-styrene (S-I-S) block copolymer, obtained from Shell Chemical Company.
**Solid tackifier resin, predominantly 8–9 to 1 polymer of piperylene and isoprene, obtained from Goodyear Tire and Rubber Co.

The solids content of the adhesive composition is 40 percent.

D. Preparation of Films

Using a number 5 wire wound rod applicator, samples of a 0.92 mil polyester film (Mylar ® 92, obtained from E. I. du Pont de Nemours & Co.) are coated in separate operations with release coat compositions prepared as above described and having components described in Table I to produce coated films having approximately 0.005 ounce per square yard (dry basis) of release coat. Another sample of film is coated with a composition containing no thickener and prepared in a similar manner. One film is left uncoated to serve as control. After drying, the opposite side of the polyester film is reverse roll-coated with the adhesive composition above-described to obtain adhesive coated film having a dry coating weight of about 0.8 ounce per square yard. After drying, the film is slit into one inch rolls and subjected to accelerated aging at 120 F.° for two weeks.

E. Performance

Tape performance is evaluated by determining unwind force and adhesion properties for each test and control tapes employing the following methods:

The unwind force is measured by attaching the roll of tape being tested to a rotating mandrel and measuring the force necessary to remove the tape from the roll at a constant speed of 150 feet/minute. The force is measured by a calibrated strain gauge attached to the support arms for the mandrel.

The adhesion is measured by peeling the tape over itself 180° at a constant speed from a smooth steel surface according to the standard procedure specified in the Pressure-Sensitive Council Test Method No. 1.

The compositions and the results of performance determinations are seen in the following Table I:

TABLE I

|  | TAPE SAMPLES | | | | CONTROL (no backsize) |
|---|---|---|---|---|---|
|  | A | B | C | D |  |
| Backsize composition: | | | | | |
| Terpolymer solution (45 percent solids) | 100 | 100 | 100 | 100 | — |
| Triethylamine | 10 | 10 | 10 | 10 | — |
| Methyl ethyl ketone | 220 | 220 | 220 | 220 | — |
| Water | 880 | 880 | 880 | 880 | — |
| Sodium carboxymethyl cellulose* (thickener) | 12 | 6 | — | — | — |
| Cross-linked acidic acrylic polymer emulsion** (thickener) | — | — | 14 | — | — |
| Ratio of polymer/thickener (solids basis) | 45/12 | 45/6 | 45/4 | 45/0 | — |
| Performance: | | | | | |
| Unwind force | 36oz. | 40oz. | 28oz. | 68oz. | 80+oz. |
| Adhesion to steel | 48oz. | 50oz. | 47oz. | 52oz. | 38oz. |

*CMC 7L2, Sodium carboxymethyl cellulose sold by Hercules, Inc. Degree of methyl substitution, about 0.7; molecular weight, about 80,000; viscosity, 2% in water, about 20 cps.
**Acrysol® ASE-60, Cross-linked acidic acrylic polymer emulsion in water, 28.0 ± 0.5% solids, sold by Rohm & Haas Co. pH, 3.5; viscosity, about 10 cps.

The tape control (no backsize composition), exhibited high mass transfer in addition to requiring high unwind force while the tapes from the remaining compositions displayed substantially no mass transfer.

EXAMPLE II

The same backsize compositions and adhesives employed to prepare tapes A and C of Example I are employed to prepare tapes E and F, respectively, by applying the compositions to a 1.5 mil polyester (Mylar® 92) film. The tapes are subjected to the two week accelerated aging test as in the previous example and the performance evaluated as before. The results are seen in Table II.

TABLE II

|  | Tape Example | |
|---|---|---|
|  | E | F |
| Unwind force | 39 oz. | 26 oz. |
| Adhesion to steel | 56 oz. | 62 oz. |

EXAMPLE III

Operations are carried out in a similar manner except that a 1.5 mil rigid vinyl film is substituted for the polyester film. Release coating compositions prepared from terpolymer described in Example I and having the compositions set forth in Table III are applied at the same weight and in a manner previously described. The opposite face of the film is coated with 8 ounces of adhesive and the film subjected to accelerated aging at 120° F. for two weeks. The tapes are then evaluated for performances. The performance results are also seen in Table III.

TABLE III

|  | TAPE SAMPLES | | | | CONTROL |
|---|---|---|---|---|---|
|  | G | H | I | J |  |
| Backsize Composition: | | | | | |
| Terpolymer Solution (45 percent solids) | 100 | 100 | 100 | 100 | — |
| Triethylamine | 10 | 10 | 10 | — | — |
| 2-Amino-2-methyl-1-propanol | — | — | — | 10 | — |
| Water | 880 | 880 | 880 | 880 | — |
| Methyl ethyl ketone | 220 | 220 | 220 | 220 | — |
| Sodium carboxymethyl cellulose | — | 12 | 6 | — | — |
| Performance: | | | | | |
| Unwind force | 50oz. | 39oz. | 42oz. | 56oz. | 80+oz. |
| Adhesion to steel | 54oz. | 54oz. | 40oz. | 51oz. | 45oz. |

EXAMPLE IV

A 2 mil matte cellulose acetate film is coated with a terpolymer backsize Composition B of Example I using a No. 5 Meier rod upon the matte surface. The surface is dried and thereafter the opposite surface is coated with the adhesive of the composition

| Synthetic isoprene, high cis | 100 parts by weight |
|---|---|
| Polyterpene resin, m.p. 115° C. | 30 parts by weight |
| Polyterpene resin, m.p. 125° C. | 40 parts by weight |
| Di-tert.-butyl-p-cresol | 1 part by weight | in a manner described in U.S. Pat. No. 3,502,497. The film is cut into tape which has very satisfactory performance and unwind characteristics.

EXAMPLE V

A clear 2 mil cellulose acetate film is coated with a release terpolymer backsize Composition C of Example I using a No. 5 Meier rod applicator. After drying the composition, the opposite surface of the film is coated with a polyvinyl ether adhesive of the composition

| n-Butyl vinyl ether high polymer | 75 parts by weight |
|---|---|
| n-Butyl vinyl ether liquid polymer (tackifier-plasticizer) | 25 parts by weight | as described in U.S. Pat. No. 2,697,084. The tape prepared from the film has easy unwind, good clarity and satisfactory adhesive performance.

EXAMPLE VI

A 1.5 mil poly(ethylene terephthalate) film is coated with a terpolymer backsize Composition A of Example I using a No. 5 Meier rod. After drying the surface, the opposite surface is coated with an acrylate adhesive composition

| 2-Ethylhexyl acrylate | 65 parts by weight |
|---|---|
| Vinyl acetate | 18 parts by weight |
| Diacetone acrylamide | 5 parts by weight |
| Maleic anhydride | 2 parts by weight |

| 3-Methacryloxypropyltrimethoxysilane | 0.05 parts by weight |

39 percent solids before cooling in toluene prepared as described in U.S. Pat. No. 3,558,574, and the coated surface dried to a dry weight of 1.0 ounce per square yard. The film is cut into tape which has good unwind properties.

I claim:

1. An aqueous release composition comprising
   (1) a release polymer formed by a polymerizing in parts by weight of
      (a) from about 40 to about 80 parts of a higher alkyl acrylate ester represented by the formula

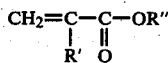

wherein R' is hydrogen or methyl, and R" is a straight chain hydrocarbon radical of from about 12 to 24 carbon atoms,
      (b) from about 5 to about 30 parts of a carboxyl supplying monomer selected from the group consisting of acrylic acid, methacrylic acid, maleic acid, maleic anhydride, half esters of maleic acid, itaconic acid and fumaric acid,
      (c) from about 10 to about 45 parts of an acrylate derived hardening monomer selected from the group consisting of acrylonitrile, methacrylonitrile, methyl acrylate, ethyl acrylate, methyl methacrylate and ethyl methacrylate;
   (2) a base;
   (3) a polar solvent wetting agent, said solvent being employed in an amount less than about 25 percent of the volatile portion of the ultimate composition; and
   (4) a water-soluble thickening agent said thickening agent being present in such amounts that the viscosity of the release composition does not exceed about 200 centipoises.

2. A composition according to claim 1 wherein the release polymer is a terpolymer copolymerization product of stearyl methacrylate, acrylonitrile and methacrylic acid.

3. A composition according to claim 1 wherein the polymer is present in the range of from about 2 to about 10 percent by weight of the ultimate composition.

4. A composition according to claim 1 in which the thickener is employed in an amount of from about 8 to about 28 parts for every 100 parts by weight of the terpolymer.

5. A composition according to claim 1 wherein the base solubilizing agent is triethylamine.

6. A composition according to claim 1 wherein the wetting agent is methyl ethyl ketone.

7. A composition according to claim 1 wherein the thickening agent is carboxymethylcellulose.

8. A composition according to claim 1 in which the thickening agent is a cross-linked acrylic acid polymer emulsion.

9. A composition according to claim 1 wherein the amount of the higher alkyl acrylate ester employed in obtaining the release polymer is from about 50 to about 65 parts per 100 parts of monomer employed.

* * * * *